(12) United States Patent
Bathiche et al.

(10) Patent No.: US 7,145,551 B1
(45) Date of Patent: Dec. 5, 2006

(54) TWO-HANDED COMPUTER INPUT DEVICE WITH ORIENTATION SENSOR

(75) Inventors: Steven Bathiche, Seattle, WA (US); Mark K. Svancarek, Redmond, WA (US); Matthew J. Stipes, Woodinville, WA (US); Aditha M. Adams, Seattle, WA (US); Thomas W. Brooks, Seattle, WA (US); Melissa S. Jacobson, Seattle, WA (US); Wolfgang A. Mack, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 892 days.

(21) Appl. No.: 09/251,519

(22) Filed: Feb. 17, 1999

(51) Int. Cl.
G09G 5/08 (2006.01)

(52) U.S. Cl. .......................................... 345/158; 463/37

(58) Field of Classification Search ................ 340/711, 340/706; 341/22; 345/161, 158, 169, 7, 345/156; 463/37, 38, 3; 273/148 B; 365/428, 365/629, 634, 636, 641, 731, 733, 740, 760, 365/764; 358/1.15, 1.18; 707/201, 203, 707/217, 219, 10; 709/201, 206, 217, 219; 715/517, 522, 526, 527, 530, 513
See application file for complete search history.

(56) References Cited

U.S. PATENT DOCUMENTS

| | | | | |
|---|---|---|---|---|
| 5,059,958 A | * | 10/1991 | Jacobs et al. ................ 340/706 |
| 5,189,403 A | * | 2/1993 | Franz et al. ................. 340/711 |
| 5,396,265 A | * | 3/1995 | Ulrich et al. ............... 345/158 |
| 5,410,333 A | * | 4/1995 | Conway ..................... 345/169 |
| 5,624,117 A | * | 4/1997 | Ohkubo et al. ......... 273/148 B |
| 5,643,087 A | * | 7/1997 | Marcus et al. ................ 463/38 |
| 5,721,842 A | * | 2/1998 | Beasley et al. ............. 395/311 |
| 5,786,807 A | * | 7/1998 | Couch et al. ............... 345/161 |
| 5,820,462 A | * | 10/1998 | Yukoi et al. ................. 463/37 |
| 5,838,304 A | * | 11/1998 | Hall ........................... 345/157 |
| 5,874,906 A | * | 2/1999 | Willner et al. ................ 341/22 |
| 6,068,554 A | * | 5/2000 | Tyler ........................... 463/38 |
| 6,069,594 A | * | 5/2000 | Barnes et al. ................. 345/7 |

* cited by examiner

*Primary Examiner*—Sumati Lefkowitz
*Assistant Examiner*—Srilakshmi K Kumar
(74) *Attorney, Agent, or Firm*—Leanne R. Taveggia; Westman, Champlin & Kelly, P.A.

(57) ABSTRACT

A hand held computer input device includes a first housing portion having at least one user actuable input device. A first extending handle is coupled to, and extends away from, the first housing portion. A second handle is also coupled to, and extends away from, the first housing portion. An orientation sensor is coupled to the first housing and is configured to sense a physical orientation of the first housing portion. The orientation sensor provides an orientation signal indicative of the physical orientation sensed.

13 Claims, 11 Drawing Sheets

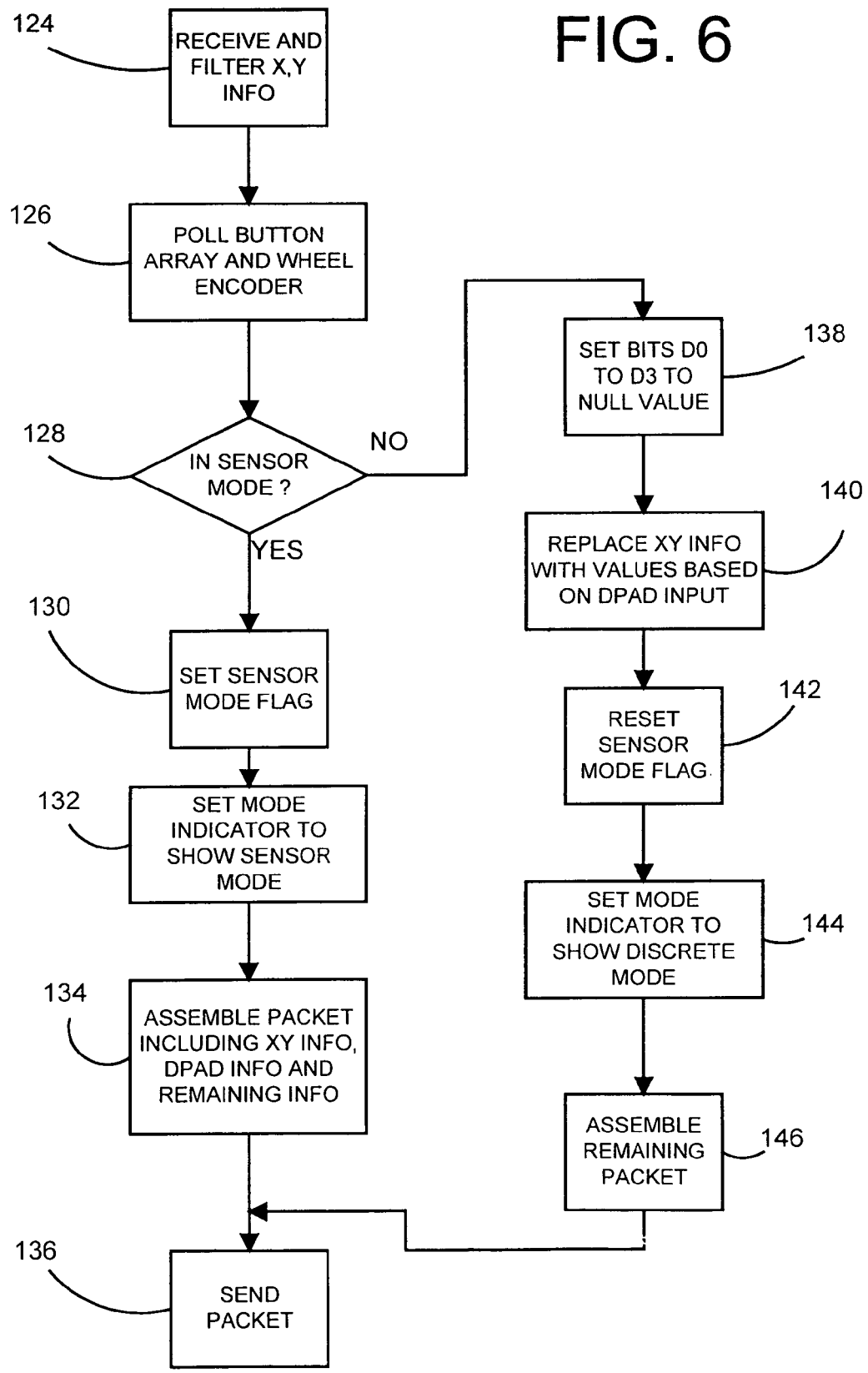

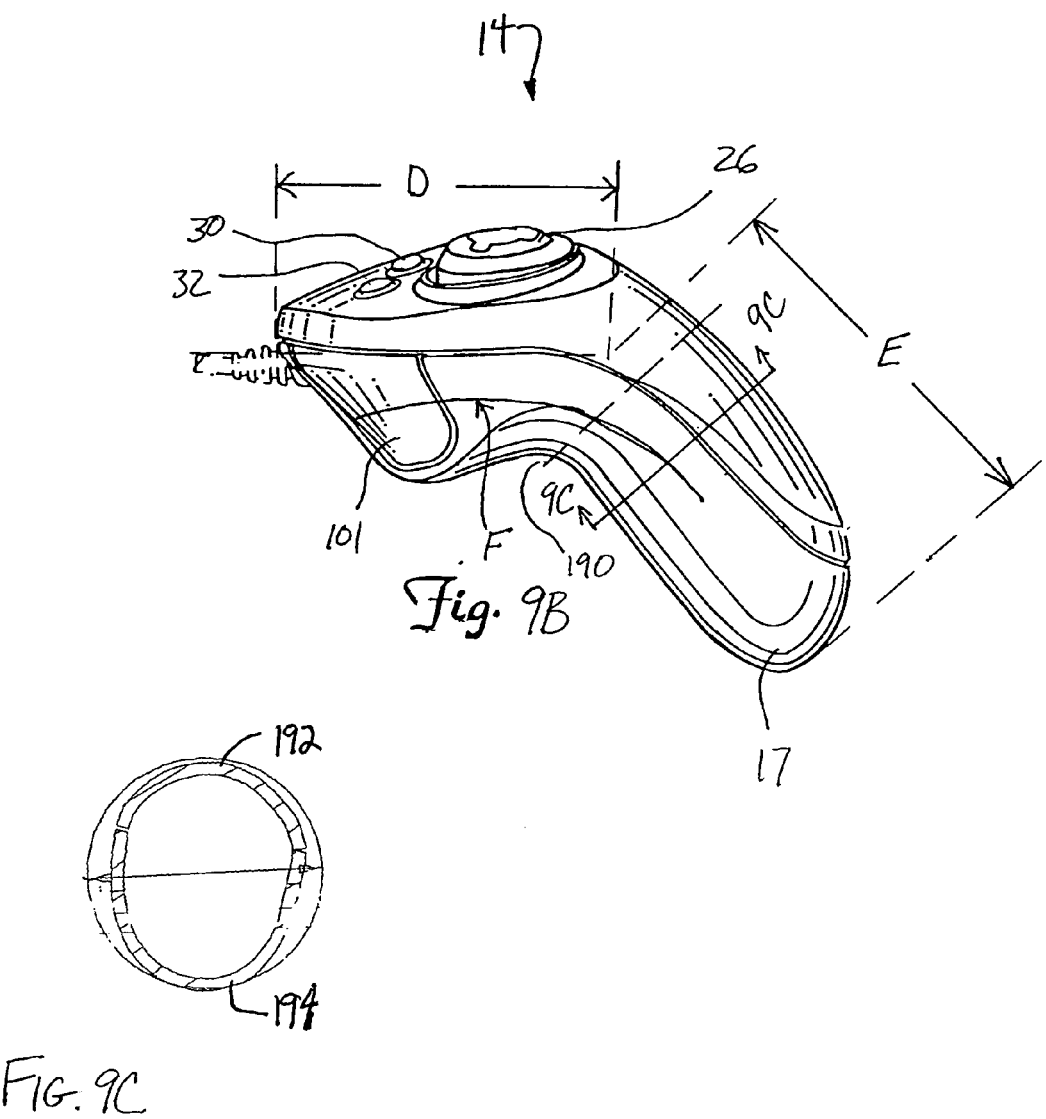

TWO-HANDED COMPUTER INPUT DEVICE WITH ORIENTATION SENSOR

REFERENCE TO CO-PENDING APPLICATIONS

Reference is made to the following U.S. patent applications:

U.S. patent application Ser. No. 09/251,519 filed on even date herewith, entitled TWO-HANDED COMPUTER INPUT DEVICE WITH ORIENTATION SENSOR AND MULTIPLE MODES OF OPERATION, which is assigned to the same assignee as the present application and filed on even date herewith;

U.S. patent application Ser. No. 29/097,150 filed Nov. 30, 1998, entitled "INPUT DEVICE", and assigned to the same assignee as the present application (and which is hereby fully incorporated by reference); and U.S. patent application Ser. No. 09/108,002 filed Jun. 30, 1998, entitled "COMPUTER INPUT DEVICE WITH INCLINATION SENSOR" and assigned to the same assignee as the present application.

BACKGROUND OF THE INVENTION

The present invention relates to a computer input device. More particularly, the present invention relates to a two-handed computer input device with an orientation sensor disposed thereon.

Many different types of user input devices are currently used for providing user input information to a computer. Such user input devices can include, for example, a point and click device (which is commonly referred to as a computer mouse), a keyboard, a joystick, and a track ball. Such user input devices all typically sense the movement of a movable element relative to a fixed base or housing portion and provide the computer with an input signal indicative of that relative movement.

Recently, free-space type user input devices have been introduced. Such devices use gravity sensing accelerometers to sense inclination of the user input device, in free space, relative to a gravity factor. Where a plurality of such sensors are provided, the sensors sense inclination of the user input device about a plurality of inclination axes. Such information is provided to a computer to control a cursor, a player, or a vehicle inside of a computer application or simulation, for example.

Many such input devices have one or more input modes. An input mode can be thought of as an input scheme that has a particular form, which is mutually-exclusive (or independent) of any other form of input. For example, pressing a button may be one type of input mode, while pushing a joystick to one side or another, is another type of input mode, which is independent of the button pushing mode.

Some types of user input devices assign more than two degrees of freedom to a single input mode. For example, a joystick which can be pushed along an X-axis, or a Y-axis has two degrees of freedom, while a joystick which can be pushed along an X or Y axis and which also can be rotated about its longitudinal axis to provide an input to the computer, has three degrees of freedom. It has been found that this type of user input device (one which provides more than two degrees of freedom per input mode) can exhibit a high degree of cross-axis interference. Cross-axis interference can be characterized by a user unintentionally actuating one degree of freedom while trying to actuate a separate degree of freedom. In other words, it is very difficult to prevent translational movement (moving a joystick along the X or Y axis) while attempting to perform a rotational movement (while attempting to rotate the joystick). Such interface between these degrees of freedom is cross-axis interference. It is believed that the tendency toward cross-axis interference increases quadratically with each added degree of freedom to any given input mode.

This same type of problem can be found in free-space type user input devices. For example, one commercially available free-space type user input device is a globe or sphere which is provided with orientation sensors that sense movement of the sphere about a pitch axis, a roll axis, and a yaw axis. It is very difficult for a user to attempt to execute rotation about the yaw axis without unintentionally executing rotation about either the pitch axis, the roll axis, or both.

Other types of free-space user input devices also exhibit other problems. For example, the Jacobs et al. U.S. Pat. No. 5,059,958 discloses a tilt sensitive non-joystick control box. However, the input device is simply a box with two buttons and with a tilt sensor disposed therein. Since one of the input modes in the Jacobs et al. device is a tilt or orientation input, the configuration of the Jacobs et al. device can promote ergonomically deficient hand position resulting in fatigue or discomfort. For example, when attempting to manipulate the Jacobs et al. device, the user may be required to maintain hand and wrist positions outside of ergonomically neutral flexion/extension and ulnar deviation ranges. Similarly, Jacobs et al. provides a very limited number of input modes.

SUMMARY OF THE INVENTION

A hand held computer input device includes a first housing portion having at least one user actuable input device. A first extending handle is coupled to, and extends away from, the first housing portion. A second handle is also coupled to, and extends away from, the first housing portion. An orientation sensor is coupled to the first housing and is configured to sense a physical orientation of the first housing portion. The orientation sensor provides an orientation signal indicative of the physical orientation sensed.

The orientation can then be transmitted to the computer in a data packet having an orientation field containing orientation information.

The device is operable in a number of different modes. In one mode, the orientation information is used to control a display, while in another mode, multiple-switch information, from a multiple-switch device is used. In either case, only two degrees of freedom are assigned to any given input mode.

Similarly, the present invention can include shapes and dimensions and sensing ranges, along with actuator layouts, that accommodate ergonomically desirable operation.

BRIEF DESCRIPTION OF THE DRAWINGS

FIG. 6 is a flow diagram illustrating the operation of the input device shown in FIG. 4 in generating an information packet.

FIGS. 9A–9C illustrate certain ergonomic features in accordance with one aspect of the present invention.

DETAILED DESCRIPTION OF THE ILLUSTRATIVE EMBODIMENTS

Figure 1:
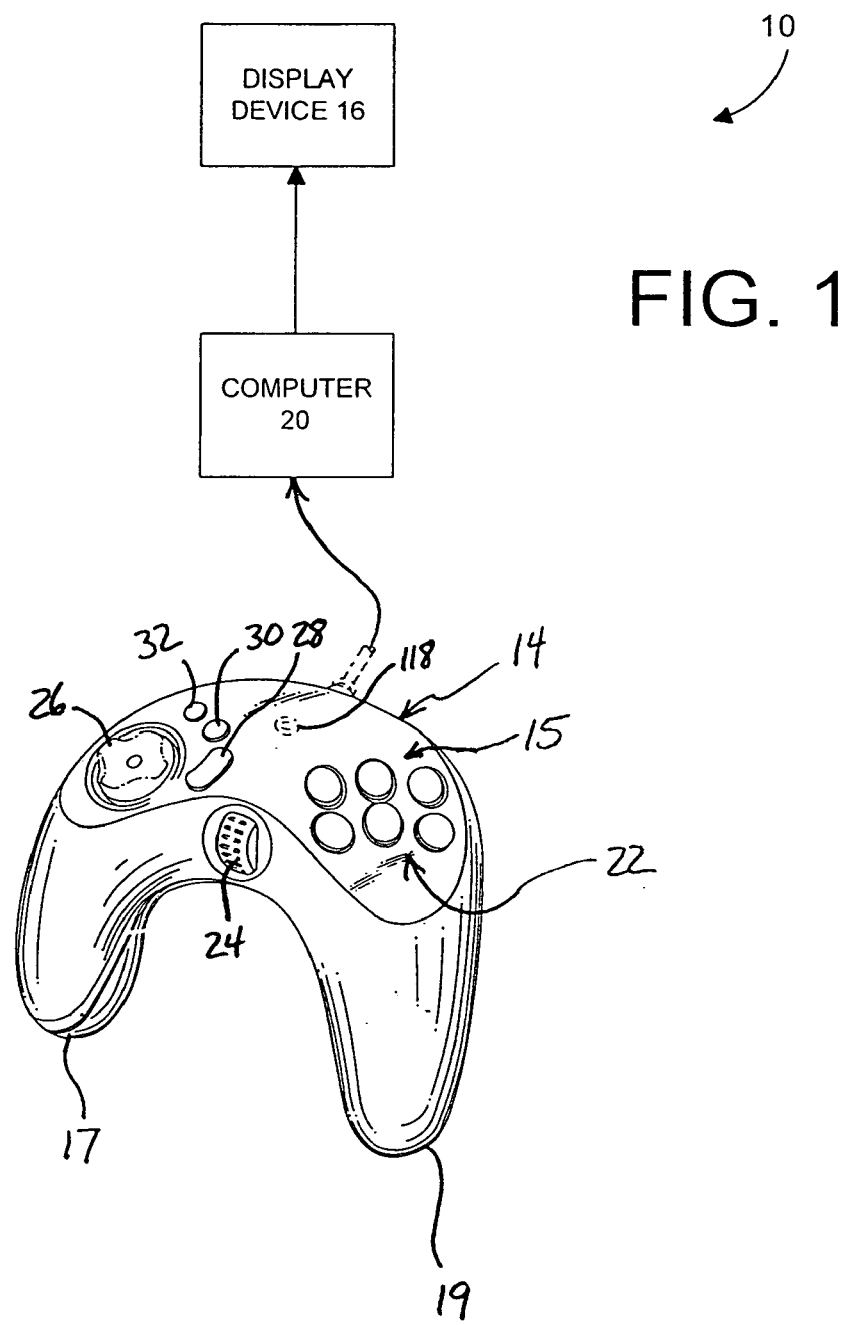
FIG. 1 is a block diagram of a computer system in which the input device in accordance with the present invention can be utilized.

FIG. 1 is a partial block and partial pictorial diagram of system 10 in accordance with one aspect of the present invention. System 10 includes input device 14, computer display device 16 and computer 20. Computer input device 14, in accordance with one aspect of the present invention, is provided with one or more orientation sensors which are arranged to sense the physical orientation of computer input device 14 in space. Computer input device 14 is also provided with an array 22 of buttons, a rotatable wheel 24, a multiple switch input device 26 (such as a direction pad or hat switch), a shift button 28, a mode switch button 30, one or more auxiliary buttons 32, and one or more triggers (shown in greater detail in FIG. 3A). FIG. 1 also shows that user input device 14 has an upper housing portion which exposes a control region or pad 15 and two depending handles 17 and 19, which depend from the control region 15 and are sized to fit comfortably within the hand of the user.

Computer input device 14 includes a controller which receives information indicative of the various buttons, wheels, and orientation sensors on input device 14 and generates an information packet indicative of that information. The information packet is provided to computer 20 (one embodiment of which is described in greater detail in FIG. 2). Computer 20 illustratively includes an application program, such as a game or other program which utilizes the information packet from input device 14. Computer 20 operates to provide the information packet from input device 14 to the application program running on computer 20, which can use the information to manipulate an object being displayed on display device 16. In an illustrative embodiment, computer 20 is a personal computer, and display device 16 is a CRT-type monitor. However, computer 20 can take other forms as well, such as a dedicated gaming computer platform, examples of which include those sold under the tradenames Sega Dreamcast, Sony Playstation, and Nintendo or other dedicated simulation or control computers. Similarly, display device 16 can include many different types of displays including a television display, LCD displays, plasma displays, to name a few.

Of course, the information packet provided by computer input device 14 to computer 20 can be used by computer 20 (and the application program running thereon) to control other items, other than a display device 16. However, the present invention will be described primarily with respect to controlling display device 16, for the sake of clarity.

Figure 2:
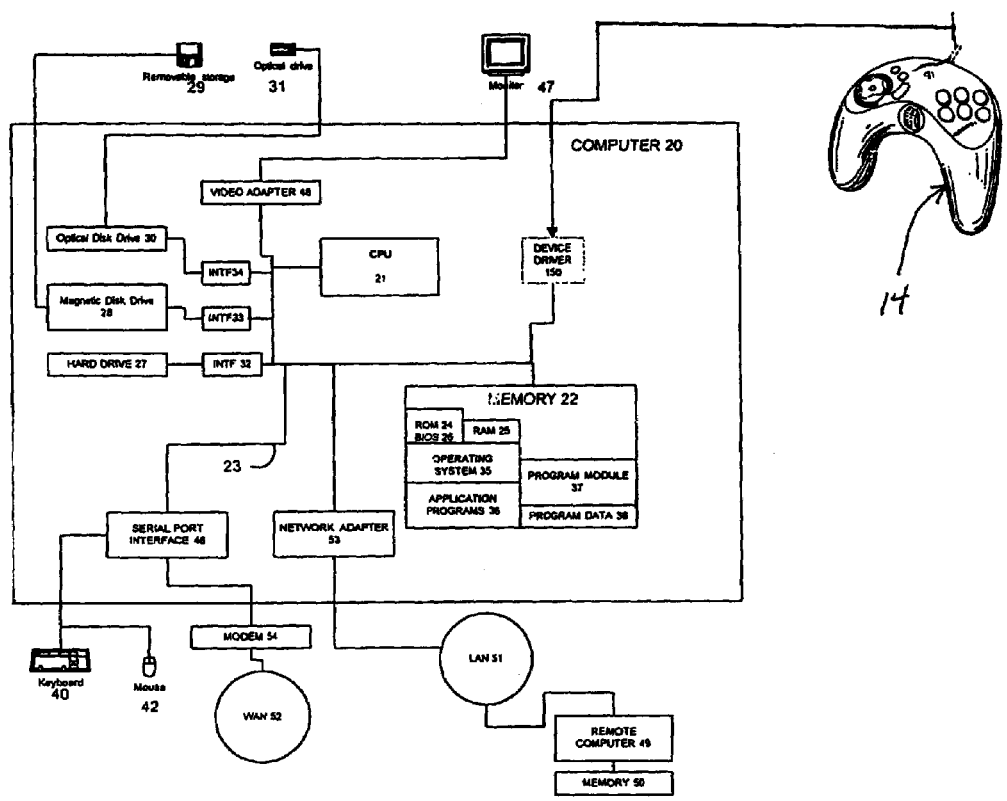
FIG. 2 is a block diagram of a computer which can be used with the input device in accordance with the present invention.

FIG. 2 and the related discussion are intended to provide a brief, general description of a suitable computing environment in which the invention may be implemented. Although not required, the invention will be described, at least in part, in the general context of computer-executable instructions, such as program modules, being executed by a personal computer or other computing device. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention is also applicable in distributed computing environments where tasks are performed by remote processing devices that are linked through a communications network. In a distributed computing environment, program modules may be located in both local and remote memory storage devices.

With reference to FIG. 2, an exemplary environment for the invention includes a general purpose computing device in the form of conventional personal computer 20, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 42 and pointing device 40. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). The monitor 16 or other type of display device is also connected to the system bus 23 via an interface, such as a video adapter 48. In addition to the monitor 16, personal computers may typically include other peripheral output devices such as a speaker and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 2. The logic connections depicted in FIG. 2 include a local are network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

When computer 20 is a dedicated computer, the specific architecture may differ from that illustrated in FIG. 2. The differences, however, are of no great consequence. All such computers include a mechanism for executing computer software and/or hardware that receives information from input devices 14 and utilizes the information received to modify the behavior or appearance of software and/or hardware. Often, this results in a change that is visible on a display device.

Figure 3A:
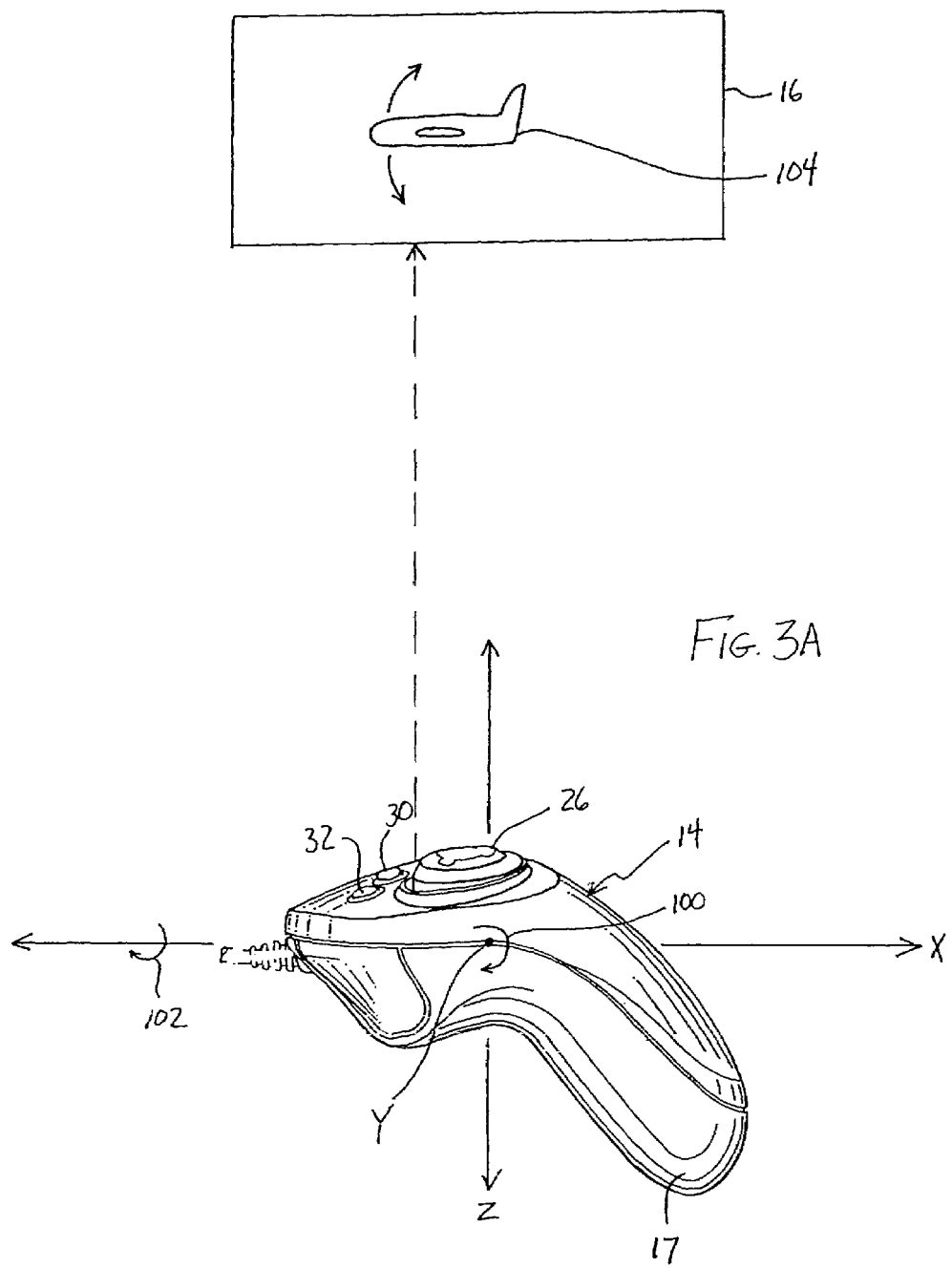
FIGS. 3A and 3B illustrate physical orientation sensing in accordance with one feature of the present invention.

FIG. 3A is a side view of one embodiment of input device 14 and illustrates that computer input device 14 is provided with one or more triggers 101 located on a forward portion of user input device 14, for actuation by the user's index finger when the user's hand is located on depending handles 17 and 19. While only one trigger 101 is shown in FIG. 3A, it will be appreciated that a second trigger 101 is disposed identically on the opposite side of device 14 from that shown in FIG. 3A.

Figure 3B:
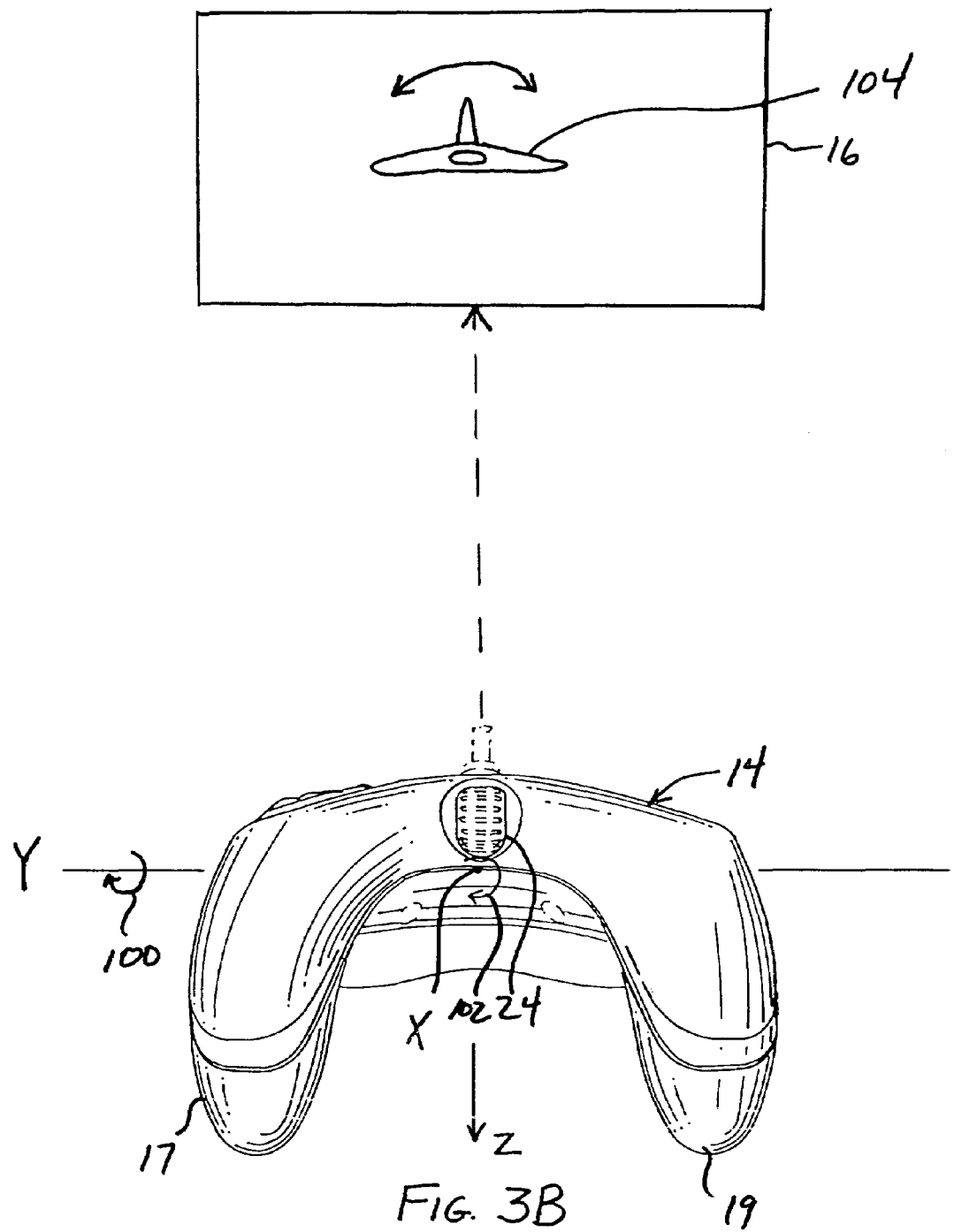

FIGS. 3A and 3B also illustrate physical orientation sensing in accordance with one aspect of the present invention. In FIG. 3A, a side view of computer input device 14 is illustrated relative to X, Y and Z axes. In the embodiment illustrated in FIG. 3A, the X and Y axes lie substantially in a horizontal plane while the Z axis lies in a substantially vertical plane. FIG. 3B illustrates computer input device 14 relative to the X, Y and Z axes, but rotated 90 degrees from the view shown in FIG. 3A. Thus, the view shown in FIG. 3B is from the rear (or user side) of computer input device 14.

In the embodiment illustrated in FIGS. 3A and 3B, the Y axis can be referred to as the pitch axis and the X axis can be referred to as the roll axis. Therefore, as user input device 14 rotates about the Y axis, user input device 14 pitches forward and backward as indicated by arrow 100. Similarly, as user input device 14 rotates about the X axis, user input device 14 rolls side-to-side, as illustrated by arrow 102.

Computer input device 14 includes sensing devices, described in greater detail later in the application, which sense the pitching and rolling movement of user input device 14 and provide a signal indicative thereof. This signal, as discussed briefly with respect to FIG. 1, can be provided to computer 20 and used to control an object on a visual display screen. For example, in FIG. 3A, an airplane 104 is illustrated on the visual display screen of display device 16. As the user rotates user input device 14 about the pitch axis (or Y axis), computer 20 controls airplane 14 on display device 16 such that its physical orientation pitches in a similar fashion. In this way, the physical orientation or pitching movement of user input device 14 is mapped directly to object 104 on the screen of visual display device 16.

Similarly, as illustrated in FIG. 3B, as the user rotates user input device 14 about the roll axis (or X axis), computer 20 receives such information and controls object 104 on the screen of display device 16 such that the object rolls in a similar fashion. Therefore, the rolling movement of computer input device 14 is mapped directly to rolling movement of object 104. Of course, the user can manipulate input device 14 to execute pitch and roll movement simultaneously with respect to both the pitch and roll axes. In that instance, computer 20 illustratively controls object 104 such that the physical orientation of object 104 is similar to that of computer input device 14, in that object 104 pitches and rolls at angles similar to those sensed by the orientation sensors in computer input device 14.

Figures 3C, 5:
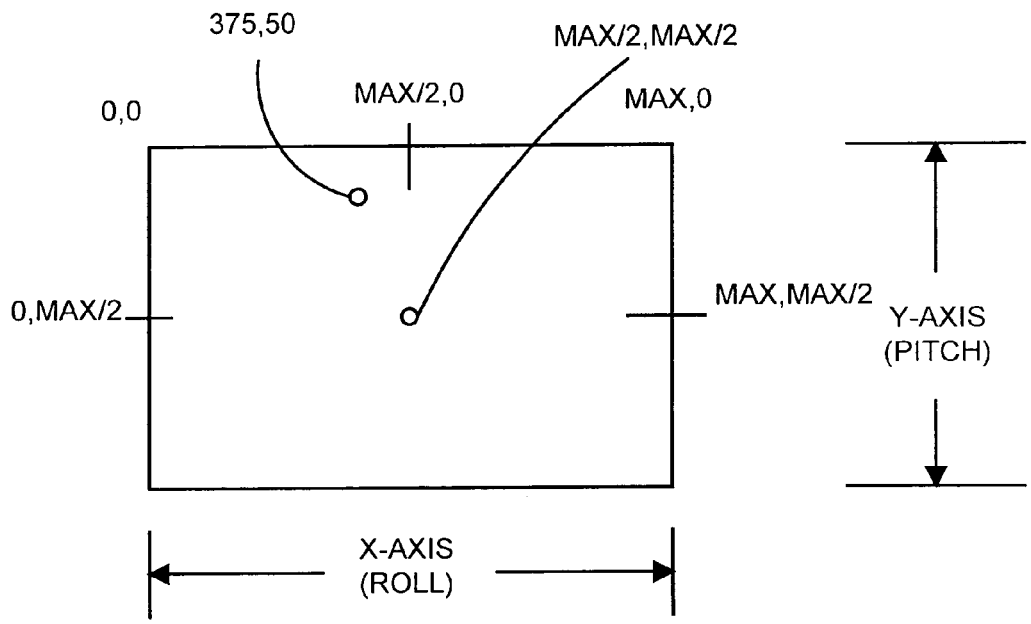
FIG. 3C illustrates an output from the input device in accordance with one aspect of the present invention.
FIG. 5 illustrates one embodiment of the an information packet generated by the input device illustrated in FIG. 4.

FIG. 3C illustrates one way in which the inclination or orientation sensing values can be determined for the information packet which is transmitted back to computer 20. FIG. 3C illustrates an array of values plotted along the X and Y axes. In the very center of the array is a value labeled max/2, max/2. This point corresponds to user input device 14 being in a completely neutral position, in which it is not rotated about either the pitch or the roll axes beyond the position illustrated in FIG. 3A. As user input device 14 is rotated about the roll axis (the X axis) the X value in the array illustrated in FIG. 3C either increases or decreases, depending upon the direction of rotation. Similarly, the Y value in the array (the value which corresponds to rotation about the pitch axis) either increases or decreases as user input device 14 is rotated about the pitch axis, again depending upon the direction of rotation.

Therefore, the upper left hand corner of the array has a value 0, 0, which corresponds to user input device being rotated to the maximum sensing angle about both the pitch and roll axes. The lower right hand corner has a value max, max, which corresponds to user input device being rotated to the opposite maximum sensing angle (in the opposite direction) about the pitch and roll axes. Another illustrative point is labeled on the array in FIG. 3C and contains an illustrative value 375, 50. This indicates that the physical orientation of computer input device 14 corresponds to a position which is slightly below the neutral position along the roll axis, and quite far below the neutral position along the pitch axis. Of course, the array can be sized with any desired number of points, depending on such things as the resolution of the orientation sensors, desired sensitivity, and desired dead zones in the sensing range. In this way, the hardware and software features of the present invention (as described in greater detail below) can be used together to provide the total user experience.

Figure 4:
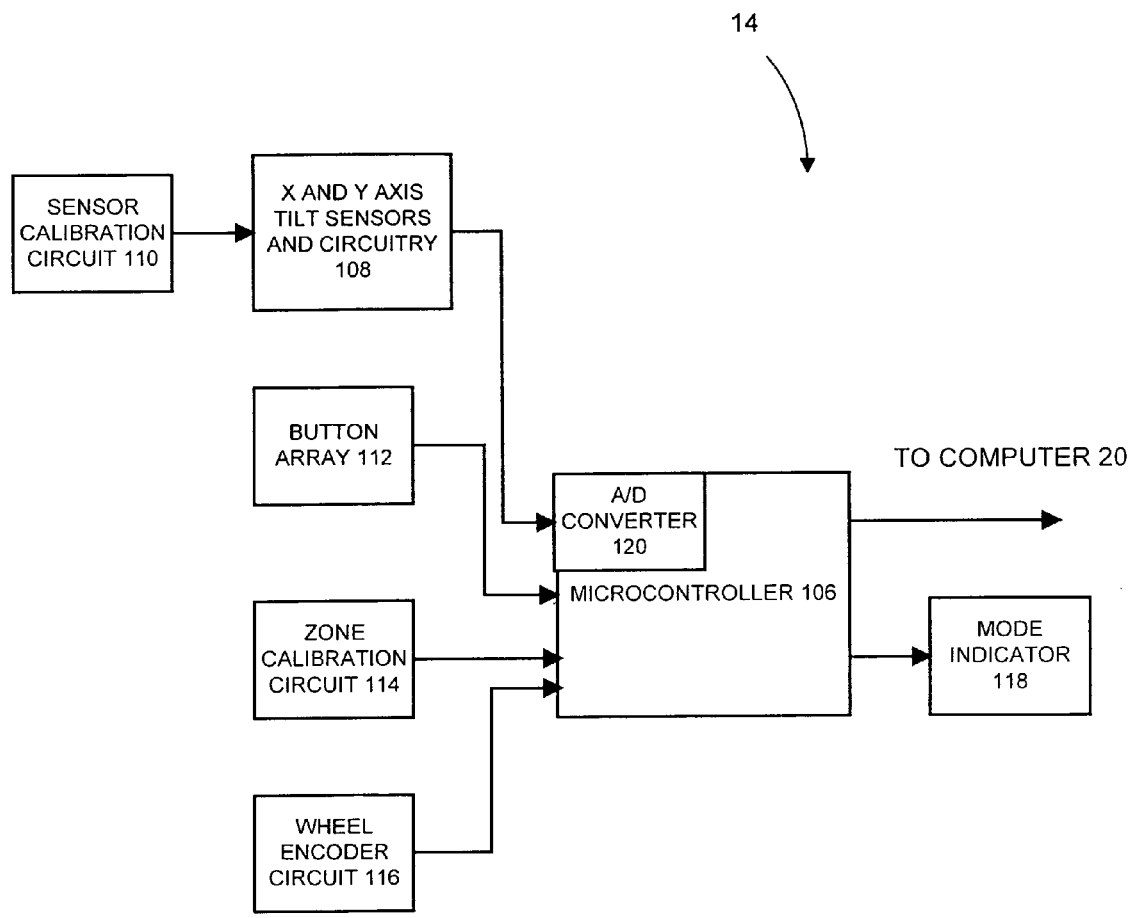
FIG. 4 is a high level functional block diagram of the present invention of the input device shown in FIG. 1.

FIG. 4 is a more detailed block diagram of user input device 14. FIG. 4 illustrates that user input device 14 includes controller 106, X and Y tilt sensors and circuitry 108, sensor calibration circuit 110, button array 112 (which includes buttons 22, 28, 30, and 32, as well as triggers 101.

Computer input device 14 also includes zone calibration circuit 114, wheel encoder circuit 116, and mode indicator 118.

One illustrative embodiment of X and Y axis tilt sensors and related circuitry 108 are described in greater detail in the above-identified U.S. patent application which is hereby fully incorporated by reference. Briefly, the illustrative sensors include accelerometers which have a sensitive axis. Two such accelerometers are illustratively placed, at right angles to one another, and are offset by approximately 45 degrees from the primary sensing axes of input device 14 (i.e., from the pitch and roll axes). Thus, as the input device 14 is rotated about the pitch and roll axes, the signals from both of the accelerometers are used to obtain an ultimate orientation value based on an offset of the accelerometers from the gravity vector. Of course, the accelerometers need not be offset from the primary sensing axes at all and can be placed at any other desired angle relative to one another, other than ninety degrees.

The signal from the accelerometers is provided to an analog-to-digital (A/D) converter 120. In the illustrative embodiment, converter 120 is integral with microcontroller 106. Of course, other discrete A/D converters can be used as well. In one illustrative embodiment, X and Y axis tilt sensors are made under the manufacturer designation number ADXL202 from Analog Devices. However, as is noted in the co-pending related patent application, any sensor which is suitable for sensing orientation or rotation about the pitch and roll axes can be used.

In order to calibrate the X and Y axis tilt sensors and related circuitry 108, computer input device 14 is illustratively placed in a test fixture which can be rotated among precisely known angles. The computer input device is then rotated to a number of precisely known angles and the values output by X and Y axis tilt sensors 108 is trimmed to a desired value using sensor calibration circuit 110, which in one embodiment is simply a circuit of trim potentiometers arranged to trim the output values of the X and Y tilt sensors. Other calibration circuits can be used as well, such as active switching elements or signal level shifters.

Button array 112, in one illustrative embodiment, is simply an array of switches which provide signals indicative of their closure to microcontroller 106. Therefore, as any of the buttons 22, 28, 30, 32 or triggers 101 are depressed by the user, the depression of those buttons or triggers causes a switch closure which is sensed by microcontroller 106. Array 112 can also include optical sensors, capacitive sensors, etc.

Zone calibration circuit 114 is used to trim the active sensing zone of the X and Y axis tilt sensors to a desired range. For example, for ergonomic or other reasons, it may be desirable to have the active sensing angle about the pitch and roll axes to be a maximum of approximately +/−45 degrees. In that case, the output of the X and Y axis tilt sensors is adjusted such that the maximum angle of inclination which can be sensed corresponds to the desired maximum sensing range. Similarly, such range can be user definable. In that case, the user can input through a keyboard, button array 112, or another input device, an input indicative of a desired sensing range. Such input can be used to program, for example, a comparator voltage used to set a maximum sensing range. Illustrative sensing ranges are discussed in greater detail with respect to FIGS. 9A–9C. As with sensor calibration circuit 110, zone calibration circuit 114 can simply be implemented with trim potentiometers arranged to trim the output of the X and Y axis tilt sensors 108 or it can be arranged as a programmable level shifter.

Wheel encoder 116 is arranged relative to rotatable wheel 24 on computer input device 14 to sense rotation, and the direction of rotation, of wheel 24. Wheel encoder circuit 116 is simply a conventional rotational encoder circuit, such as that used to track rotation of a mouse wheel. One such wheel encoder circuit is described in U.S. Pat. No. 5,473,344, entitled 3-D CURSOR POSITIONING DEVICE, issued on Dec. 5, 1995, assigned to the same assignee as the present application, and which is hereby incorporated by reference. Other sensors can also be used, such as optical or mechanical sensors or other types of electrical sensors, any of which can be used to sense rotation of wheel 24.

Mode indicator 118, in one illustrative embodiment, is a light emitting diode (LED) which can assume either a red or a green color (or other colors). As is described in greater detail below, switch 30 can be used to change the mode of operation of computer input device 14. Therefore, with each depression of button 30, microcontroller 106 provides an output to mode indicator 118 changing the color of the LED. In addition, the LED which embodies mode indicator 118 is also illustratively configurable with different luminous settings (such as dim and bright settings). In order to accommodate users who encounter difficulty distinguishing between red and green, controller 106 also illustratively changes the luminous setting as it changes the color of the LED, so that the user has a more easily identifiable visual indication of mode changes.

Microcontroller 106 is also provided with an output suitable for being coupled to computer 20. In one illustrative embodiment, the output provided by microcontroller 106 is provided according to a game port protocol. In another illustrative embodiment, the output from microcontroller 106 is according to a universal serial bus (USB) protocol. Similarly, a USB converter cable can be coupled between microcontroller 106 and computer 20 to accommodate the necessary transmission of data.

Prior to discussing packet formation, it should be noted that computer input device 14, as briefly mentioned above, may be operated in at least two different modes of operation. In the first mode of operation (referred to as the sensor mode) the X and Y axis tilt sensors 108 generate orientation information indicative of the physical orientation of computer input device 14 and provide that information to microcontroller 106 through A/D converter 120. The application program on computer 20 which is controlling the visual display uses the orientation information from X and Y tilt sensors 108 to control the display.

However, computer input device 14 can also illustratively be used in a different mode. In that mode (which is entered by depression of mode switch 30 and can be referred to as the discrete or game pad mode) the X and Y tilt sensors 108 are not used by the application in controlling the physical orientation of the object on the visual display screen. Instead, the application uses the information from multiple switch device 26. In other words, when multiple switch device 26 is a direction pad input device (a D-pad) the D-pad is configured substantially as a multiple-axis rocker switch. Four switches are located along two orthogonal axes such that the user can actuate one or two of the switches at any given time. If the user presses the D-pad from a neutral or centered position forward or reverse (e.g., to 90 degrees or 270 degrees), only one of two switches along the forward/reverse axis will be actuated. If the user presses the D-pad straight from side to side (e.g., to 0 degrees or 180 degrees), only one of another pair of switches along the side-to-side axis will be actuated. However, if the user presses the D-pad to one of the corners, such as forward and to the left, simultaneously, (e.g., to 135 degrees) then two of the switches will be actuated at the same time.

In this way, user manipulation of the D-pad to one of the nine possible positions (neutral, one of the four corners or along one of the orthogonal axes) can be identified by looking for one of nine discrete states. Those states include a null state (when in the neutral position when no switches are actuated), four single switch actuation states (when one of the four switches are actuated) and four dual switch activation states (when moved to a corner so two of the four switches are simultaneously actuated).

In the discrete or game pad mode, the user can use the multiple switch device 26 (e.g., the D-pad) to control the orientation of the object being displayed, instead of the physical orientation of input device 14. Instead of pitching input device 14 to the left, the user can accomplish a similar movement by simply pressing the D-pad 26 to the left. This is interpreted by the application in computer 20 (when running in the game pad mode) in a similar fashion to rotation of the user input device about the pitch axis when in the sensor mode. Similarly, when the user moves the D-pad forward and to the left, actuating two switches, this is viewed by the application in computer 20 in a similar fashion to pitching computer input device 14 to the left and rolling it downward relative to the pitch and roll axes. Switching between modes is accomplished by simply depressing mode button 30.

FIG. 5 illustrates one embodiment of a data packet 122 which is prepared by controller 106 and transmitted to computer 20. While data packet 122 can be transmitted to computer 20 either serially, or in parallel, the substance of data packet is illustrated in FIG. 5 in terms of six, 8-bit bytes of information. The bytes are labeled byte 0–byte 5 along the left hand column of packet 122 and the bits are labeled bits 0–7 along the top row of packet 122.

The signals from each of the X and Y axis tilt sensors is converted by A/D converter 120 into a digital word having illustratively 10 bit resolution and which is representative of the orientation sensed by the particular tilt sensor (although higher or lower resolution can be used as well, as desired). The 10 bit resolution data is represented by bits X0–X9 (for the X axis tilt sensor) and bits Y0–Y9 (for the Y axis tilt sensor). This information is included in packet 122 beginning with byte 0, bit position 0, and continuing through byte 2, bit position 3.

The signal from wheel encoder circuit 116 is a signal which indicates rotation, and direction of rotation, of rotatable wheel 24. This signal is provided in six bit resolution (again, any desired resolution can be used) and is represented by bits W0–W5, which extend from byte 2, bit position 4 through byte 3, bit position 1.

The button array 22 includes six action buttons which are configured to close six switches. The signals from those switches are represented by bit designators A0–A5, and are included in packet 122 beginning at byte 3, bit position 2 and extending through byte 3, bit position 7.

The signals from triggers 101 are also each represented by a bit. Those bits are located at byte 4, bit positions 0 and 1.

Depression of sensor button 30 is represented by a bit located at byte 4, bit position 2, and the depression of shift key 28 is also represented by a bit located at byte 4, bit position 3. The depression of button 32 is also represented by a bit located in byte 4, at bit position 4.

Bit positions 5 and 6 in byte 4 are flags which can be set to represent any desired conditions. For example, flag bits F0 and F1, located at byte 4, bit positions 5 and 6 can represent an error condition. In that case, a system error is detected by controller 106 and sets an error flag bit. Computer 20, in response to receiving the error flag bit, can then provide controller 106 with an error code request. Controller 106 then retrieves an error code associated with the error which was detected and provides that to computer 20. Necessary corrective action can then be taken, or any desirable display can be provided to the user. In addition, flag bits F0 and F1 can also represent parity information. For example, one or both of the flags can represent odd or even parity for the entire data packet, or for a portion of the data packet.

Byte 4, bit position 7, and byte 5, bit positions 0–2, are bits which represent the state of the multiple-switch device 26. In the embodiment illustrated, device 26 is a direction pad. Therefore, the bits in the associated bit locations are labeled D0–D3. The following table illustrates the position represented by bits D0–D3 relative to D-pad 26.

| D3 | D2 | D1 | D0 | Position |
|----|----|----|----|----------|
| 0 | 0 | 0 | 1 | 0 degrees |
| 0 | 0 | 1 | 0 | 45 degrees |
| 0 | 0 | 1 | 1 | 90 degrees |
| 0 | 1 | 0 | 0 | 135 degrees |
| 0 | 1 | 0 | 1 | 180 degrees |
| 0 | 1 | 1 | 0 | 225 degrees |
| 0 | 1 | 1 | 1 | 270 degrees |
| 1 | 0 | 0 | 0 | 315 degrees |
| 0 | 0 | 0 | 0 | No D-Pad depressed |

The remaining bit positions in packet 122 are spares.

FIG. 6 is a flow diagram illustrating the preparation of data packet 122 illustrated in FIG. 5, in accordance with one feature of the present invention. The two modes (sensor mode and game pad mode) discussed above, are illustrated in the flow diagram of FIG. 6. It should be noted that the replacement of the X and Y position information with the data represented by D-pad 26 and discussed below with respect to FIG. 6 can be done either by controller 106 in input device 14, or by any desired control component in computer 20. However, for the sake of clarity, the description proceeds with respect to replacement of the X and Y position data with the D-pad data by controller 106.

First, controller 106 receives and filters XY position information. This is indicated by block 124. In filtering the X and Y position information, controller 106, in one illustrative embodiment, over-samples and smooths the data received from the sensors. That data can be provided to filtering logic implemented in controller 106. The filtering logic may illustratively employ low pass filtering techniques to remove large, or abberational, spikes. Once the data has been received and filtered, it is stored in controller 106 for later creation of data packet 122.

Controller 106 also periodically polls the button array 112 and wheel encoder 116 to obtain the data associated with the button array and wheel encoder. Although controller 106 can receive interrupt signals indicating button depressions as well. In any case, the information from the button array 122 and wheel encoder 116 is also illustratively subjected to anti-jitter and over-sampling techniques in order to improve the robustness of the signals. This is indicated by block 126.

Once the state of the buttons and wheel encoder is determined, controller 106 determines whether the sensor mode button 30 has been depressed. If so, controller 106 toggles from its current mode (either the sensor mode or the game pad mode) to the other mode (either the sensor mode or the game pad mode). This is indicated by block 128. It should be noted, at this point, that the mode determination function can be performed by a driver in computer 20, or another component in computer 20, or by an application which eventually receives packet 122. In that instance, the mode determination is made based on the sensor bit (the bit located at byte 4, bit position 2 in packet 122) which, when set, indicates that input device 14 is operating in the sensor mode, and when cleared, indicates that computer input device 14 is operating in the game pad mode. This implementation is discussed in greater detail below with respect to FIGS. 7 and 8. However, for the sake of simplicity, the present discussion proceeds with respect to the mode determination being made by controller 106.

In any case, if, at block 128, controller 106 determines that the computer input device 14 is operating in the sensor mode, controller 106 sets the sensor mode flag. This flag is located at byte 0, bit position 2 in packet 122, and is indicated in the flow diagram by block 130. Controller 106 then sets mode indicator 118 to show that computer input device 14 is operating in the sensor mode. In the illustrative embodiment, controller 106 causes the mode indicator light to glow bright red. This is indicated by block 132.

Controller 106 then assembles packet 122 by placing the XY data, the wheel data, the button data and the multiple switch device data in the appropriate positions in packet 122. This is indicated by block 134. Controller 106 then sends the packet according to the appropriate protocol to computer 20. This is indicated by block 136.

If, at block 128, controller 106 determines that computer input device 14 is operating in the game pad mode, controller 106 sets the D-pad data represented by bits D0–D3 in packet 122 to the null value shown in Table 1 (although any predetermined value can be used). This is indicated by block 138. Controller 106 then replaces the XY information in bytes 0, 1 and 2 in packet 122 with information that corresponds to the D-pad data. For instance, if the D-pad data is null, the information placed in the XY fields in packet 122 is set to max/2, max/2 (shown in FIG. 3C). However, if the D-pad data indicates that the D-pad has been positioned in the 90 degree configuration, the X and Y fields are provided with data indicative of the max/2, 0 point. Therefore, the XY data in the X and Y position fields in packet 122 is replaced with one of nine predetermined values which are chosen based upon the position of the D-pad sensed in the most recent sensing interval. If the D-pad data indicates that the D-pad has been depressed to the zero position, the X and Y position information is replaced with the max, max/2 value. If the D-pad data indicates that the D-pad has been depressed to the 180 degree position, the X and Y position information is replaced with the 0, max/2 value. This is indicated by block 140. Any other desired relationship between the D-pad data and predetermined position information can also be used. For example, D-pad positions can be assigned to different position information or scaled position information.

After the X and Y tilt information has been replaced by the D-pad values, controller 106 resets the sensor flag located in byte 4, bit position 2, to indicate that computer input device 14 is operating in the game pad, or discrete, mode. This is indicated by block 142. Controller 106 then provides an output to mode indicator 118 to cause mode indicator to indicate that computer input device 14 is operating in the game pad mode. This is indicated by block 144. Controller 106 then assembles the rest of the information into packet 122, including the wheel information, the button information, the trigger information, and the flag information. This is indicated by block 146. Controller 106 then transmits packet 122, as assembled, to computer 20.

Again, it should be noted that determining the particular mode (sensor or discrete) that computer input device 14 is operating in can be undertaken on the computer 20, such as in the device driver associated with computer input device 14, or in any other portion of computer 20. In that case, the device driver simply receives packet 122 with the X and Y tilt information in the original fields. The driver then examines the mode indicator bit in byte 4, bit position 2 to determine which mode computer input device 14 is operating in. If it is operating in the sensor mode, the device driver 150 simply transmits the X and Y tilt information, along with the other necessary information, as usual. However, if, instead, computer input device 14 is operating in the discrete mode, then the device driver and computer 20 replaces the X and Y tilt information with the D-pad information, as discussed with respect to FIG. 6. This is described in greater detail with respect to FIGS. 7 and 8.

In either case, it should be noted that by replacing the X and Y tilt information with the D-pad information, in the X and Y tilt information fields, the application is not required to know what mode computer input device 14 is operating in. The application simply examines the x and y tilt information fields and takes whatever information is placed therein and controls the display accordingly. Therefore, the user can switch modes, on-the-fly, and application programmers need not even be aware of the mode switch.

Figure 7:
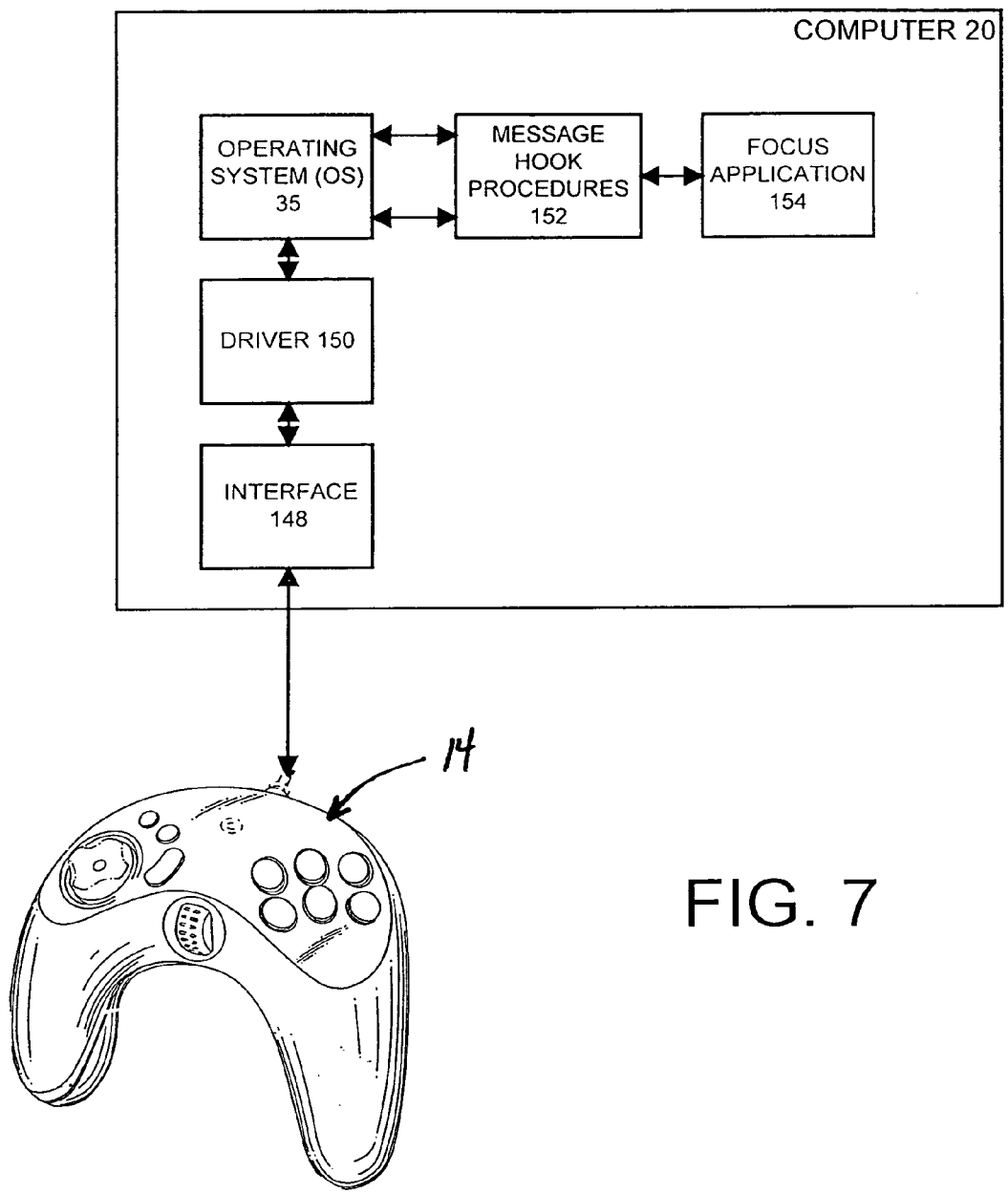
FIG. 7 is a functional block diagram of a computer coupled to the input device illustrated in FIG. 1.
Figure 8:
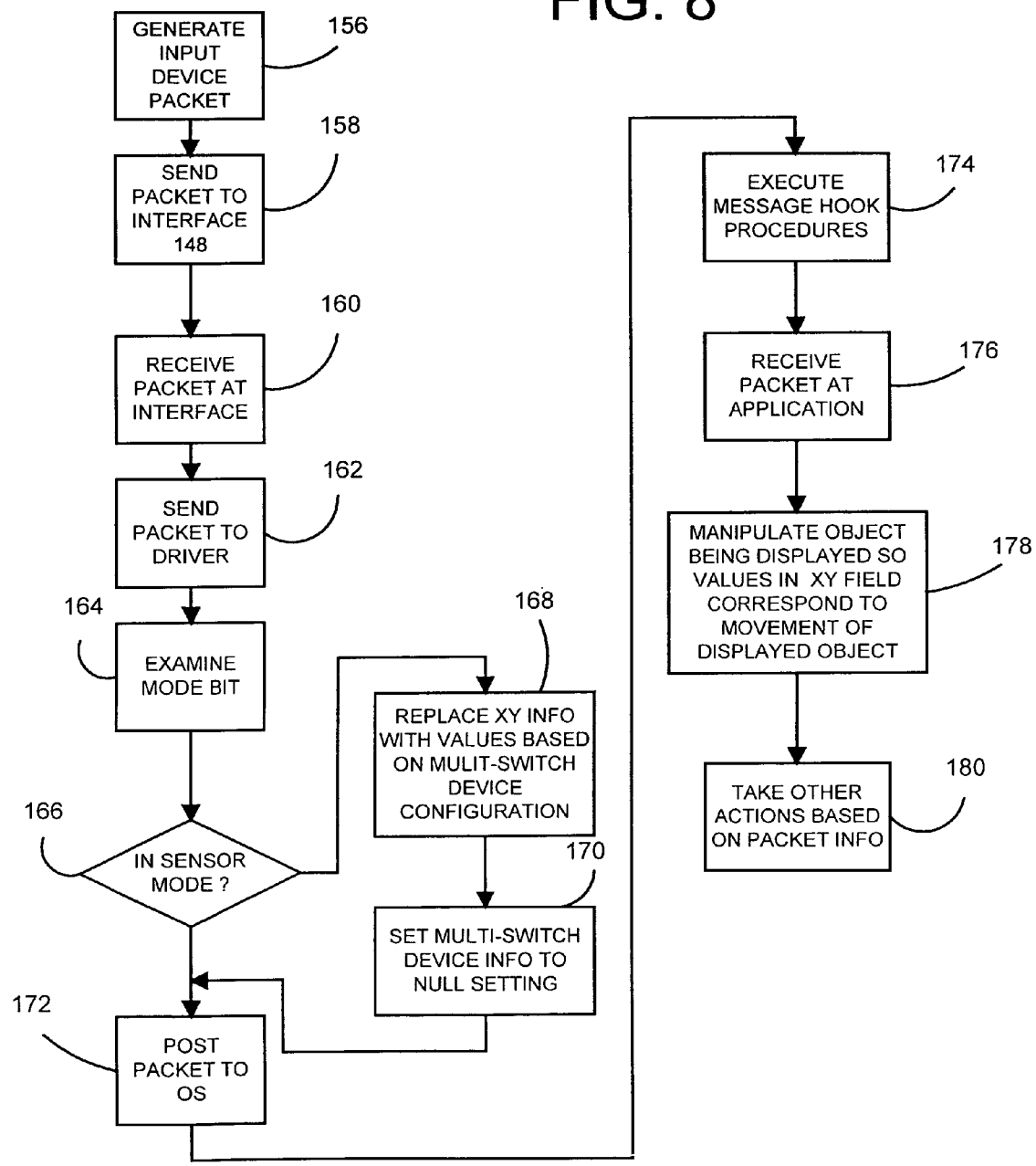
FIG. 8 is a flow diagram illustrating the operation of computer 20 in receiving and manipulating an information packet from the input device.

FIG. 7 is a functional block diagram of computer 20. FIG. 8 is a flow diagram associated with FIG. 7 which illustrates one embodiment of the processing of a packet 122 from computer input device 14 in the embodiment in which the mode determination is made by a device driver on computer 20. FIGS. 7 and 8 are discussed here together. Packet 122 is assembled, as indicated with respect to FIG. 6, and passed from computer input device 14 to interface 148. This is indicated by blocks 156, 158 and 160. As discussed above, interface 148 can be a USB interface, a game port interface, or another desired interface. When interface 148 receives the packet, it prepares a set of parallel packets and provides the parallel packets to input device driver 150. This is indicated by block 162.

Driver 150 examines the mode bit to determine whether computer input device 14 is operating in the sensor mode or the discrete (game pad) mode. This is indicated by blocks 164 and 166. If computer input device 14 is operating in the discrete mode, driver 150 replaces the X and Y tilt information with values corresponding to the multiple-switch device position (i.e., to values which correspond to the D-pad information). This is indicated by block 168. Next, driver 150 sets the multi-switch device information to a null setting. This is indicated by block 170.

If, however, at block 166, it is determined that input device 14 is operating in the sensor mode, the XY tilt information is maintained. In either case, driver 150 creates a message based on the packet received. The creation of the message can illustratively be identical to the manner in which existing user input devices create such messages.

The device message is then transmitted to operating system 35. This is indicated by block 172. In one illustrative embodiment, operating system 35 is a "WINDOWS NT®", a "WINDOWS 95®", or a "WINDOWS 98®" brand operating system (provided by Microsoft Corporation of Redmond, Wash.). Operating system 35 includes a device message hook list that identifies a series of message hook procedures 152. When operating system 35 receives the message from driver 150, it examines the message hook list to determine if any device message procedures have registered themselves with operating system 35. If at least one device message hook procedure registered itself with operating system 35, operating system 35 passes the message to the registered message hook procedure 152 that appears first on the list.

The called message hook executes and returns a value to operating system 35 and instructs the operating system to pass the message to the next registered message hook. This is indicated by block 174. The message may, for example, represent a command to an application which owns the window currently under focus in computer 20. In that instance, the message hook procedure 152 issues the command to the focus window application. In response, the focus window application 154 performs the desired function.

After the message hook procedure 152 issues the command to focus application 154, the message hook procedure 152 consumes the message by removing the message from the message chain. This is accomplished by returning a value to operating system 35 which indicates to the operating system that it should not pass the device message to any other message hook procedures.

In any case, the desired application program 154 eventually receives the packet information. This is indicated by block 176. The application then manipulates the object being displayed so that the XY information in the XY field from the input device corresponds to desired movement of the object being displayed. This is indicated by block 178. It will be appreciated that the XY information, in the XY field, may not be the information from the X and Y tilt sensors on input device 14, but may instead be values corresponding to the configuration of the D-pad (based on the D-pad information). In either case, the application program simply manipulates the object being displayed based on that information.

The application 154 then takes any other actions which are desired, based upon the other packet information which it has received. This can be actions based on, for example, button depressions, trigger depressions, and wheel rotations. This is indicated by block 180.

Figure 9A:
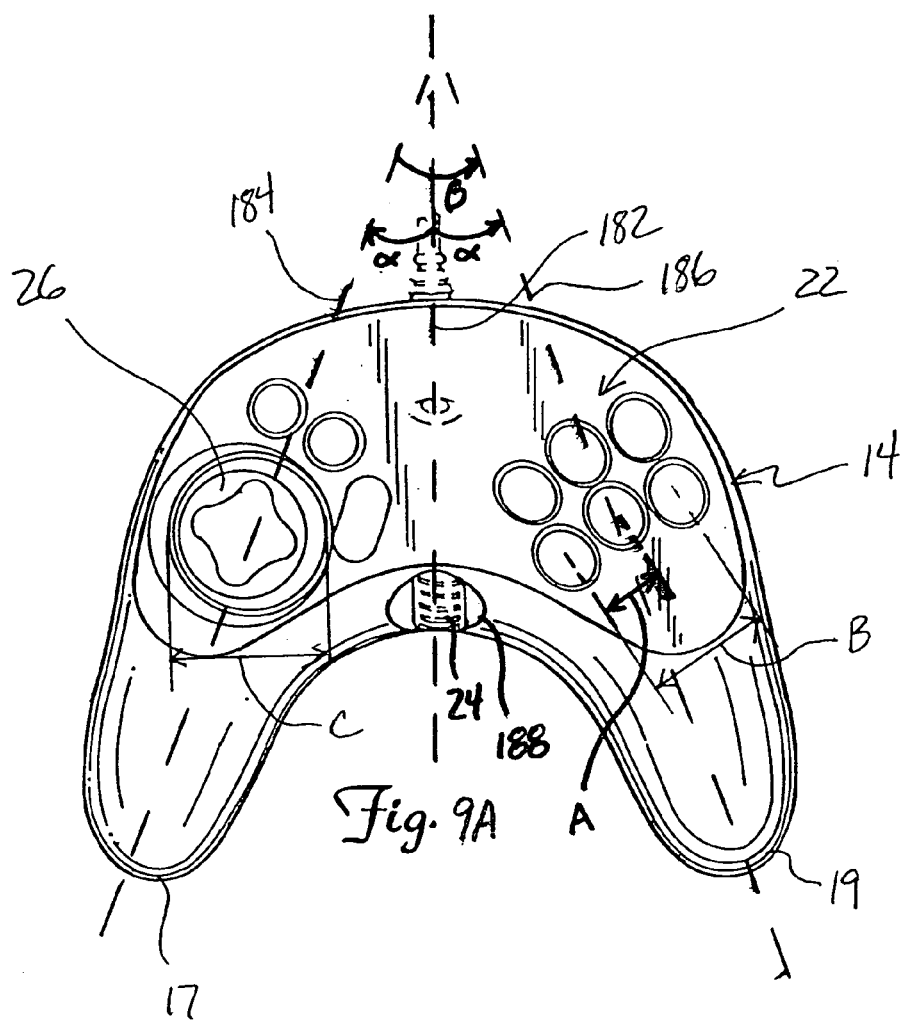

FIGS. 9A–9C illustrate a variety of ergonomic features which are implemented in one embodiment of computer input device 14. FIG. 9A is a top plan view of computer input device 14 illustrating a variety of the buttons and user actuable input devices. FIG. 9A illustrates that the depending handles 17 and 19 each have axes designated by lines 184 and 186 which generally bisect depending handles 17 and 19. Handles 17 and 19 are each disposed at a toe-in angle $\alpha$ relative to an axis 182, which generally bisects device 14. The toe-in angles $\alpha$ are preferably in a range of 5–25 degrees (rendering a combined angle $\beta$ of depending handles 17 and 19 relative to one another in a range of 10–50 degrees).

In another embodiment, the angle $\beta$ between axes 184 and 186 is in a range of 22–26 degrees, and in another embodiment is approximately 24 degrees. Thus, the toe-in angle $\alpha$, of each depending handle 17 and 19 is illustratively in a range of approximately 11–13 degrees, and further can be approximately 12 degrees.

The user actuable input devices, such as the button, the rotatable wheel and the D-pad or hat switch are illustratively spaced relative to one another to accommodate thumb movement and to avoid inadvertent actuations, for North American males having hand sizes in a range of the 5th percentile to the 95$^{th}$ percentile. Therefore, the button array 22 is arranged such that the individual buttons have a center-to-center spacing, indicated by the letter A in FIG. 9A, of approximately 10–35 millimeters. In another embodiment, the center-to-center spacing A is in a range of 13–15 millimeters. Similarly, the center-to-center spacing between the outermost buttons, and indicated by the letter B in FIG. 9A is illustratively sized to accommodate the thumb swing across button array 22, when the user's hand is gripping handle 19 for North American Males from the 5th percentile the 95$^{th}$ percentile. Thus, the center-to-center spacing of the outermost buttons in button array 22, is illustratively in a range of approximately 25–35 millimeters, and can be in a range of 27–30 millimeters.

Similarly, the diameter of D-pad 26 (or a similarly situated hat switch or other multiple-switch input device) indicated by letter C in FIG. 9A, is illustratively in a range of approximately 10–35 millimeters, and can be in a range of approximately 27–31 millimeters.

Wheel 24 is a rotatable member which can be ball-shaped, elongate, or otherwise shaped. Also, in one illustrative embodiment, wheel 24 is located equidistant from both depending handles 17 and 19. In this way, wheel 24 can be accommodated by both left handed and right handed users. Also, the wheel 24 is illustratively located fairly low and between depending handles 17 and 19 such that the wheel can be rotated by the user simply executing a downward or upward flicking motion with the thumb. Similarly, wheel 24 is illustratively coated with a soft rubber or similar material, or has another type of friction-increasing surface to increase the user's thumb grip on wheel 24. Also, as illustrated in the figures, wheel 24 can be provided with a plurality of ribs or surface roughness to further increase the friction between the user's thumb and rotatable wheel 24. FIG. 9A also illustrates that, in one illustrative embodiment, wheel 24 is disposed within a reveal 188 which is generally defined by the upper housing portion of computer input device 14. The reveal 188 is defined by a gradually descending portion of the upper housing to expose a greater portion of wheel 24, to make wheel 24 more readily accessible to thumb actuations.

FIG. 9B illustrates additional ergonomic features of input device 14. The upper housing portion of device 14 has a length represented by letter D in FIG. 9B. D is illustratively between 70 and 90 mm and can be approximately 79 millimeters. The handle length E of each of the depending handles 17 and 19 of input device 14 is illustratively sized to accommodate the palm width of North American males in the 5th percentile through 95th percentile. Thus, length E is in a range of approximately 80–105 millimeters and can be approximately 84.5 millimeters. Also, in one illustrative embodiment, depending handle portions are downwardly disposed with respect to the upper housing portion generally about an arc illustrated by line F wherein the arc length is in a range of approximately 80–90 millimeters and can be approximately 86 millimeters.

In addition, triggers 101 are illustratively hinged along a top portion thereof and are generally concave in shape. This allows the triggers to be more easily actuated by force applied to any portion of the surface of triggers 101. Similarly, the triggers extend rearwardly enough such that they can be actuated by the index finger of users having an index finger of a length which fits within the North American male 5th percentile through 95th percentile. Thus, from a junction between the upper housing portion and depending handles 17 and 19, generally indicated by line 190, triggers 101 extend rearwardly such that the distance between junction 190 and the rearward portion of trigger 101 is no greater than approximately 65 millimeters. Similarly, trigger 101 extends forwardly to approximately 70 millimeters, and can extend to approximately 75 millimeters, or approximately 84 millimeters or further.

FIG. 9C is a cross section taken across the generally central portion of one of handles 17 and 19 indicated by section line 9C–9C in FIG. 9B. Handles 17 and 19 illustratively have a rearward and outward side 192 which faces the palm of the hand, and a frontward and inward side 194, which faces the concave-shaped surface of the flexed fingers. The rearward side 192 has a radius of curvature which is somewhat larger than the radius of curvature of the forward side 194. The diameter of the depending handles 17 and 19 around the inner, or palm side 194, is illustratively arranged to accommodate North American males in the 5th percentile to 95th percentile and is thus illustratively in a range between approximately 43 millimeters and 53 millimeters. The grip diameter can be approximately 47 millimeters. Similarly, the outer periphery, or girth of the depending handles 17 and 19 is in a range of approximately 130–140 millimeters and can be approximately 136 millimeters.

With the configuration discussed above, a user can hold computer input device 14 in an initial position such as that shown in generally in FIG. 9B and have a neutral initial wrist posture. On average, the initial posture is approximately 19° wrist extension and approximately 16° ulnar deviation. These values are within a range of neutral posture for wrist posture. Neutral wrist flexion/extension is approximately 0°–20° wrist extension, and neutral wrist deviation is approximately 0°–20° ulnar deviation.

Also, in order to provide ergonomic benefits, the X and Y axis tilt sensors are illustratively trimmed to have an active sensing angle about both the pitch and roll axes of approximately +/−20 degrees to +/−55 degrees. In another illustrative embodiment, the sensing angles are in a range of +/−30 degrees to +/−45 degrees.

In addition, the overall weight of device 14, without a cable, can be in a range of approximately 165 grams to 250 grams and can also be approximately 208 grams. This allows a majority of users to use the device for quite a prolonged period without encountering significant fatigue.

Therefore, the present invention provides an input device which can be used in an ergonomically efficient manner.

CONCLUSION

Thus, the present invention provides a free-space type user input device which has an orientation sensor which senses physical orientation of the user input device and provides a signal indicative of that orientation. Illustratively, no more than two degrees of freedom are assigned to any mutually exclusive input mode. Similarly, multiple input modes are provided which can be used simultaneously to increase the overall degrees of freedom on the device. The present invention, in one embodiment, includes two depending handles which can be used to more easily manipulate the device in an ergonomically neutral fashion. The present user input device also illustratively includes a variety of secondary input devices, such as buttons, rotating wheels, a multiple-switch device, and triggers. Further, the present invention illustratively includes a mode selector which can be actuated by the user to switch between modes for providing orientation information to a computer. In one mode, the orientation sensor provides the orientation information, while in another mode, the multiple-switch device provides the orientation information. Similarly, the device is configured with components thereof having sizes and shapes to accommodate ergonomic actuation.

Although the present invention has been described with reference to preferred embodiments, workers skilled in the art will recognize that changes may be made in form and detail without departing from the spirit and scope of the invention.

What is claimed is:

1. A method of preparing a data packet indicative of operator manipulation of a hand held computer input device, the method comprising:
   receiving information indicative of a physical orientation of the computer input device;
   receiving information indicative of a configuration of a multiple-switch device located on the computer input device and having at least two different degrees of motional freedom wherein movement of the multiple-switch device in the different degrees of motional freedom causes actuation of different switches in the multiple-switch device;
   placing data in an orientation field and a multiple-switch field in the data packet;
   receiving information indicative of a selected mode of a plurality of selectable modes of operation; and
   playing the data in the orientation field and the multiple-switch field in the data packet based on the selected mode comprising:
       placing orientation data indicative of the physical orientation of the computer input device in the orientation field when the selected mode is a first selected mode; and
   placing predetermined orientation data in the orientation field when the selected mode is a second selected mode, the predetermined orientation data corresponding to the configuration of the multiple-switch device.

2. The method of claim 1 wherein placing predetermined orientation data comprises:
   selecting a predetermined orientation value from a plurality of predetermined orientation values based on the configuration of the multiple-switch device.

3. The method of claim 1 wherein placing the data further comprises:
   placing predetermined switch configuration data in the multiple-switch field when the selected mode is the second selected mode.

4. The method of claim 3 wherein the predetermined switch configuration data corresponds to depression of no switches in the multiple-switch device.

5. A method of preparing a data packet indicative of operator manipulation of a hand held computer input device, the method comprising:
   receiving information indicative of a physical orientation of the computer input device;
   receiving information indicative of a configuration of a multiple-switch device located on the computer input device and having at least two different degrees of motional freedom wherein movement of the multiple-switch device in the different degrees of motional freedom causes actuation of different switches in the multiple-switch device; and
   placing data in an orientation field and a multiple-switch field in the data packet based on the selected mode is performed on the computer by the input device driver by:
       receiving an input device data packet comprising an orientation field including orientation information indicative of the physical orientation of the computer input device, a multiple-switch field including switch information indicative of the configuration of the multiple-switch device and a mode field including mode information indicative of the selected mode;

maintaining the orientation information in the orientation field and the switch information in the multiple-switch field when the selected mode is a first selected mode; and replacing the orientation information in the orientation field with a predetermined orientation value, based on the switch information, when the selected mode is a second selected mode.

6. The method of claim 5 wherein the step of placing the data in the orientation field and the multiple switch field in the data packet based on the selected mode is performed on the computer by the input device driver by:

replacing the switch information in the multiple-switch field with a predetermined value when the selected mode is the second selected mode.

7. A method of preparing a data packet indicative of operator manipulation of a hand held computer input device, the method comprising:

receiving orientation information indicative of a physical orientation of the computer input device;

receiving rotation information indicative of rotation of a rotatable member on the computer input device; and placing data in an orientation field and a rotation field in the data packet based on the orientation information and the rotation information.

8. The method of claim 7 and further comprising:

receiving switch information indicative of a configuration of a multiple-switch device on the computer input device; and placing data in a multiple-switch field in the data packet based on the switch information.

9. The method of claim 8 and further comprising:

receiving button information indicative of depression of a plurality of buttons on the computer input device; and placing data in a button field in the data packet based on the button information.

10. A data structure generated by a computer input device for transmission to a computer, comprising:

an orientation field containing orientation data indicative of a pitch and roll physical orientation of the computer input device; and a switch field containing switch information indicative of a multiple-switch device located on the computer input device and having at least two different degrees of motional freedom wherein movement of the multiple-switch device in the different degrees of motional freedom causes actuation of different switches in the multiple-switch device; and a rotation field containing rotation information indicative of rotation of a rotatable member on the computer input device.

11. The data structure of claim 10 and further comprising:

a button field containing button information indicative of depression of buttons on the user input device.

12. The data structure of claim 11 and further comprising:

a mode field containing mode information indicative of a state of a mode selector on the computer input device.

13. A computer input device, comprising:

a first housing portion including at least one user actuable input device;

a first extending handle, coupled to and extending away from, the first housing portion;

a second extending handle, coupled to and extending from the first housing portion;

an orientation sensor coupled to the first housing portion and sensing a physical orientation of the first housing portion and providing and orientation signal indicative thereof;

a controller coupled to the orientation sensor and configured to receive the orientation signal and place data in an orientation field, based on the orientation signal, in a data packet;

a multiple-switch device having at least two different degrees of motional freedom and actuable by an operator such that movement of the multiple switch device in the different degrees of motional freedom causes actuation of different switches in the multiple-switch device, the controller being configured to receive switch information indicative of a configuration of the multiple-switch device and to place switch data in a multiple-switch field in the data packet based on the switch information; and a mode selector, actuable by an operator, the controller being configured to receive mode information indicative of a selected mode of a plurality of selectable modes of operation and to place the data in the orientation field and the multiple-switch field in the data packet based on the selected mode.

* * * * *